United States Patent

[11] 3,565,175

| | | | |
|---|---|---|---|
| [72] | Inventor | James W. Wilson | |
| | | Brea, Calif. | |
| [21] | Appl. No. | 867,032 | |
| [22] | Filed | Oct. 16, 1969 | |
| [45] | Patented | Feb. 23, 1971 | |
| [73] | Assignee | Union Oil Company of California | |
| | | Los Angeles, Calif. | |

[54] METHOD FOR REDUCING GRAVITY SEGREGATION OF AN AQUEOUS FLOODING FLUID
26 Claims, 1 Drawing Fig.

[52] U.S. Cl. .................................................. 166/269, 166/273
[51] Int. Cl. .................................................. E21b 43/22
[50] Field of Search .......................................... 166/268, 269, 273—275, 258

[56] References Cited
UNITED STATES PATENTS

| 3,148,730 | 9/1964 | Holbert | 166/269X |
|---|---|---|---|
| 3,221,810 | 12/1965 | Marx | 166/269 |
| 3,251,413 | 5/1966 | Rudisell | 166/269 |
| 3,330,348 | 7/1967 | Hardy et al. | 166/269X |
| 3,370,649 | 2/1968 | Wolgemuth | 166/274 |

*Primary Examiner*—Ian A. Calvert
*Attorneys*—Milton W. Lee, Richard C. Hartman, Lannas S. Henderson, Dean Sandford and Robert E. Strauss ABSTRACT: Gravity segregation of an aqueous flooding fluid injected into a permeable subterranean reservoir containing lower density fluids is reduced by adjusting the viscosity of the aqueous flooding fluid injected into progressively lower levels of the reservoir so as to decrease the mobility of the fluid injected into each of the progressively lower levels sufficiently to offset the additional pressure exerted at the lower levels by the higher density aqueous flooding fluid tending to drive the aqueous fluids through the reservoir, whereby a substantially uniform vertical flood front is maintained. The viscosity of the fluid injected at each level may be continuously or incrementally decreased during injection.

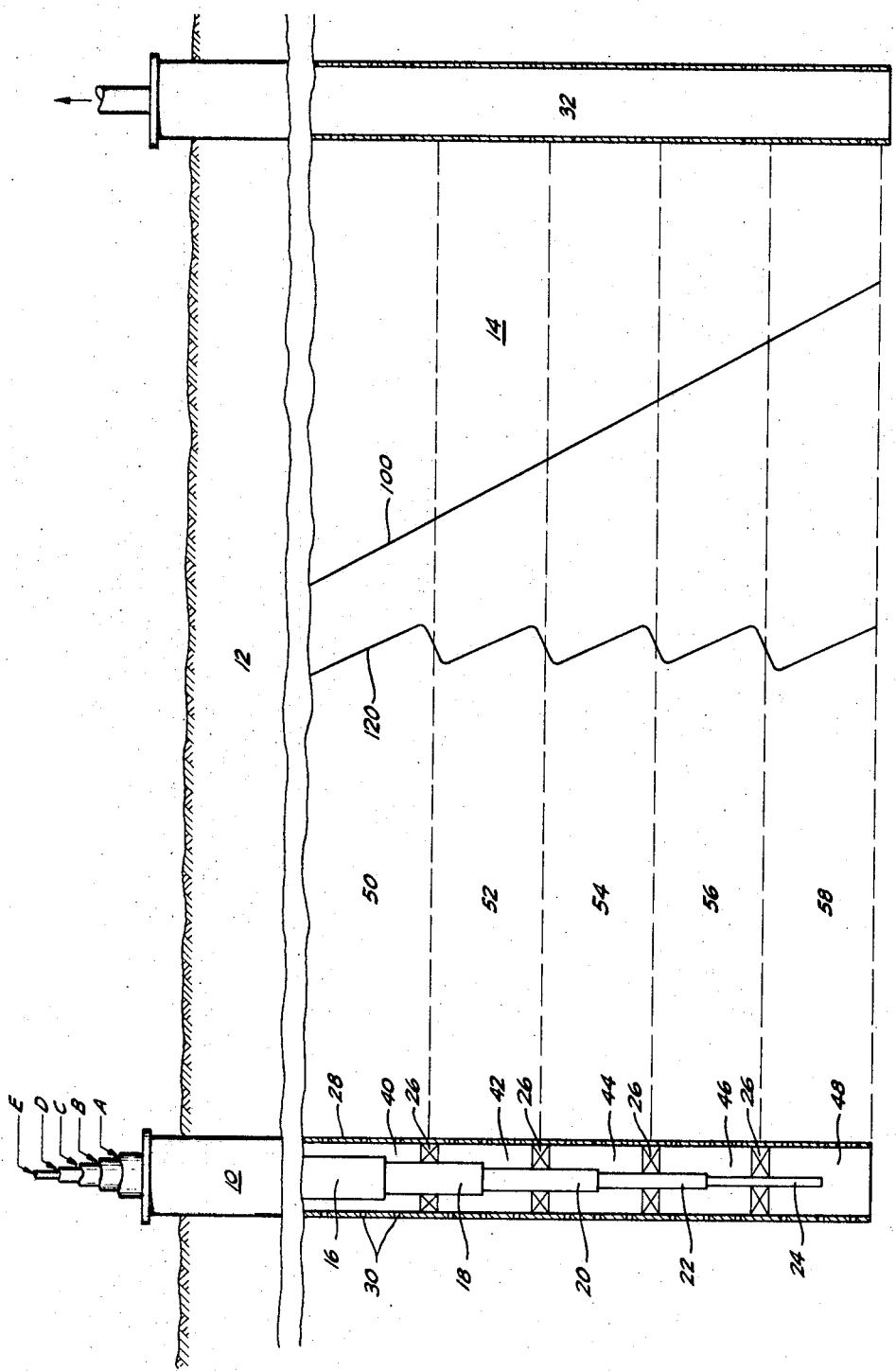

METHOD FOR REDUCING GRAVITY SEGREGATION OF AN AQUEOUS FLOODING FLUID

This invention relates to the recovery of oil from subterranean oil-bearing reservoirs, and more particularly to a method for reducing gravity segregation of an aqueous flooding fluid injected into a permeable reservoir containing lower density reservoir fluids.

It has long been recognized 1 substantial amounts of oil remain unrecovered at the completion of normal primary recovery operations. Hence, various secondary methods of recovering additional quantities of oil, such as the well-known techniques of water flooding and polymer solution flooding, have been developed. In these processes, an aqueous flooding fluid is injected into the oil-bearing reservoir through one or more input wells, and forced through the reservoir toward at least one spaced production well. The flooding fluid displaces oil from the formation and forces it into the producing well. The flooding operation is usually continued until a substantial quantity of the flooding fluid breaks through the reservoir and enters the producing well, at which time the cost of pumping the produced fluids to the surface increases greatly.

Early breakthrough of the flooding fluid into the producing well is generally accompanied by a low volumetric sweep efficiency, i.e., a portion of the reservoir is not swept by the drive fluid, thereby leaving some of the otherwise recoverable oil unrecovered. Since a high volumetric sweep efficiency is desired, it is advantageous to eliminate or compensate for some of the causes of early breakthrough.

One of the causes of early breakthrough is gravity segregation of the flooding fluid within the reservoir. Gravity segregation is the underrunning of the flooding fluid in the lower portion of the reservoir during a flooding operation caused by the differential pressure exerted on the flooding fluid at these lower zones. Specifically, the fluid pressure exerted in the lower zones of a reservoir is increased over that in the upper zones by the additional fluid head. In a displacement process where the displacing fluid is of higher density than the displaced fluids, such as found in the typical water or polymer solution flooding process, a differential pressure exists between that portion of the reservoir containing the higher density drive fluid and those portions of the reservoir having a high oil saturation, and this differential pressure is especially accentuated in the lower zones of the reservoir. The differential drive pressure exerted at the lower levels of the reservoir increases the volumetric flow rate of flooding fluid through these zones, thus causing underrunning of the flooding fluid. Gravity segregation occurs to some extent in all flooding processes, however, it is particularly troublesome in flooding relatively thick reservoirs, i.e, those reservoirs having relatively large vertical thicknesses.

The prior art has recognized the problems associated with gravity segregation, and several methods of ameliorating this problem have been proposed. One of the suggested methods is to reduce the density of the flooding fluid to a value substantially equal to that of the formation fluids. In this method, the gravity head exerted by the flooding fluid is essentially the same as that exerted by the formation fluid, hence there is substantially no differential pressure available to cause underrunning. While this technique can effectively eliminate gravity segregation, it is not usually found practical because of the high cost of low density flooding agents as compared with the cost of water and brine. Further, where a slug of low density fluid is employed and forced through the formation by water or brine, gravity segregation may be reduced at the interface between the reservoir fluid and the low density fluid, but is still detrimentally encountered at the interface between the low density fluid and the water.

Accordingly, a principal object of this invention is to provide a method of reducing gravity segregation of high density aqueous flooding fluids injected into permeable petroleum reservoirs in the practice of secondary oil recovery. Another object of this invention is to provide a method of reducing gravity segregation of flood water in water flooding process. A further object of the invention is to provide a water flooding process for the recovery of oil that exhibits increased volumetric sweep efficiencies. A still further object of the invention is to provide a water flooding process in which a substantially uniform vertical flood front is maintained. Other objects and advantages of the invention will be apparent from the following description.

The manner in which the foregoing and other objects of this invention are realized will be apparent from the accompanying specification and claims considered together with the appended drawing, which shows a vertical cross section of an earth formation penetrated by an injection and a production well and schematically illustrates the practice of the improved flooding process of this invention in such a formation.

Briefly, this invention contemplates a method for reducing gravity segregation in a secondary recovery process in which an aqueous flooding fluid is injected into a reservoir containing fluids having densities lower than the density of the aqueous fluid, It has been found that gravity segregation of the higher density aqueous flooding fluid can be reduced by adjusting the viscosity of the aqueous flooding fluid injected into various contiguous vertically disposed levels of the reservoir so as to incrementally decrease the mobility of the flooding fluid injected into progressively lower levels sufficient to offset the additional pressure exerted at the lower levels by the higher density aqueous flooding fluid that tends to drive the aqueous fluid through the lower levels of the reservoir. With this technique, a substantially vertical flood front is maintained throughout the reservoir.

In the practice of this invention, the aqueous flooding fluid is injected into the reservoir through one or more injection wells under sufficient pressure to cause the flooding fluid to enter into and pass through the permeable reservoir, but at a pressure less than that required to hydraulically fracture the reservoir. As the flooding fluid passes through the reservoir, oil and other fluids are displaced and forced ahead of the advancing flooding fluid front toward the producing wells, whereupon the oil can be recovered by conventional means. The injection and production wells can be arranged in any convenient pattern designed to achieve maximum contact of the oil-bearing zones of the reservoir by the advancing flood front, such as the conventional "five-spot" pattern wherein a central producing well is surrounded by four somewhat symmetrically located injection wells, or similar "seven-spot" and "nine-spot" patterns. Another of the conventional flooding patterns that can be employed in the practice of this invention is the "line-drive" pattern in which the injection wells are arranged in a line so that the injected flooding fluid advances through the reservoir to force the oil toward one or more spaced production wells that can also be arranged in a line substantially parallel to the line of injection wells.

Ideally, the viscosity of the flooding fluid is varied throughout the vertical extent of the reservoir so as to provide a uniform mobility adjustment sufficient to offset the differential gravity head exerted at each vertical level of the reservoir. However, it is usually more practical to control the viscosity of the flooding fluid in a number of incremental steps, and to separately inject a plurality of aqueous flooding fluids having selected viscosities into a like number of vertically disposed contiguous strata, thereby obtaining a stepwise decrease in mobility at each progressively lower strata. While the number of viscosity changes or stepwise alterations is to a large extent discretionary, it is usually preferred that at least three stepwise viscosity modifications be made in the flooding fluids injected into progressively lower strata, and in relatively thick reservoirs it is preferred that an appropriate viscosity modification be made every 5 to 75 vertical feet, and more preferably every 10 to 50 vertical feet.

Preferably, where the aqueous flooding fluids are separately injected into the various vertically disposed contiguous strata, mechanical packers are employed in the injection wells to in isolate vertical sections of the well adjacent the approximate boundaries of the various strata so as to prevent fluid communication between strata through the well, thus preventing mixing of the separately injected fluids. While the mechanical packers can be set at any suitable spacing, it is preferred that they be set so as to include, so far as possible, strata having similar permeabilities within each separately isolated section. Also, the aqueous flooding fluids are separately injected into the plurality of contiguous vertically disposed strata at injection rates selected to provide a substantially uniform fluid velocity in each stratum within the formation. Accordingly, the volumetric injection rate of aqueous flooding fluid into each stratum is determined with regard to the vertical thickness and average porosity of the respective stratum.

The flooding fluids employed in this invention generally have a viscosity between about 0.4 and 50 centipoises and usually between about 0.5 and 25 centipoises. The flooding fluids are aqueous solutions of water or brine with an effective amount of a viscosity increasing agent. Suitable viscosity increasing agents include fatty acid soaps, alginates, sucrose, glycerine and minor proportions of various water-soluble polymers. Water-soluble polymers that are effective in increasing the viscosity of water include modified starches, polysaccharide obtained by the fermentation of starch derived sugar, alkyl and hydroalkyl cellulose derivatives, such as hydroxyethyl cellulose and carboxymethyl cellulose, polyvinyl alcohol, polyvinyl pyrrolidone, polyacrylic acid, polyacrylamides, partially hydrolyzed polyacrylamides, polystyrene sulfonates, ethylene oxide polymers, acrylic acid-acrylamide copolymers prepared by copolymerizing acrylic acid and acrylamide in the presence of trialkylboron catalyst, and acrylic acide-acrylamide-diacetone acrylamide terpolymers prepared by reacting the monomers in the presence of trialkylboron catalyst.

In one embodiment of the invention, thickened flood water is injected into each of the lower strata throughout the flooding operation. However, in many applications it is preferred to adjust the viscosity of only an initial portion of each of the flooding fluids, and to follow the viscous portion with conventional flood water. Thus, in this embodiment of the invention, an initial slug of viscous aqueous flooding fluid is injected into each of the strata of the reservoir, and displaced therethrough by the subsequent injection of flood water. The slugs of viscous fluid can vary from about 0.01 to 0.5 pore volume of the respective stratum, and preferably from about 0.05 to 0.3 pore volume. The slug of aqueous flooding fluid injected into the uppermost stratum of the reservoir can be injected without viscosity adjustment, or alternatively, the viscosity of this slug can be increased to provide mobility control, and the viscosities of the fluids injected into the lower strata correspondingly increased.

The viscosity of the aqueous flooding fluid injected into each particular stratum of the reservoir required to obtain a fluid having a mobility sufficient to offset the additional pressure exerted at that particular stratum by the higher density fluid head can be estimated from a consideration of the mechanics of fluid flow through permeable bodies. According to Darcy's equation for radial flow through permeable systems, the approximate drive pressure required to push a given quantity of fluid through a permeable formation is:

$$P_i - P_w = \frac{q\mu \ln(r_i/r_w)}{2\pi k h} \quad (1)$$

where
$P_i$ is the pressure at the interface between the flood front and the formation fluid;
$P_w$ is the pressure in the well;
$q$ is the volumetric flow rate of flooding fluid in the permeable formation;
$\mu$ is the viscosity of the flooding fluid;
$k$ is the permeability of the formation;
$h$ is the vertical thickness of the permeable formation;
$r_i$ is the radial distance from the injection well to the interface between the flood front and the formation fluid; and
$r_w$ is the radius of the injection well.

Equation 1 predicts only the differential pressure required to push a fluid through a permeable formation at a given elevation, and does not take into consideration any of the gravity forces which may be affecting the advancement of the flood. Equation 1 can be modified to include these gravitational forces as follows:

$$P_i^o - P_w^o + \Delta\gamma(h-z) = \frac{q\mu \ln(r_i/r_w)}{2\pi k h} \quad (2)$$

where
$P_i^o$ is the pressure at the interface between the flood front and the formation fluid at the top of the formation;
$P_w^o$ is the pressure in the well at the top of the formation;
$\Delta\gamma$ is the density difference between the flooding fluid and the formation fluid; and
$z$ is the distance from the bottom of the formation to any higher elevation in the formation.

Equation 2 can be further reduced to the following equation:

$$q = \frac{2\pi k h[P_i^o - P_w^o + \Delta\gamma(h-z)]}{\mu \ln(r_i/r_w)} \quad (3)$$

Equation 3 expresses the volumetric flow rate of the flooding fluid in terms of the radius from the well ($r_i$), the viscosity of the flooding fluid ($\mu$), the various formation parameters ($k$, $h$, $r_w$), the differential drive pressure at the top of the permeable formation ($P_i^o - P_w^o$), and the gravity effect $[\Delta\gamma(h-z)]$. It is apparent from the equation that when all of the other parameters are constant, the volumetric flow rate ($q$) at a depth where $z$ equals $h$, i.e., at the top of the formation, is less than the volumetric flow rate at a depth where $z$ is 0, i.e., at the bottom of the formation. This increasing flow rate at increasing depths clearly illustrates the underrunning or gravity segregation present in water flooding operations.

In accordance with this invention, the underrunning predicated by equation (3 is eliminated or substantially reduced by appropriately changing the viscosity of the flooding fluid at various elevations. While equation 3 suggests that the flooding fluid viscosity ($\mu$) be varied in a continuous manner throughout the vertical extent of the reservoir, it is usually more advantageous to control the fluid viscosity in a number of incremental steps. Where the formation is divided into several contiguous, vertically disposed strata, the appropriate viscosity for the flooding fluid injected into each of the strata can be estimated from the following relationship:

$$\mu = \left[\mu' + \frac{4.9 \times 10^{-2} \kappa' H' \Delta\gamma(Z'-Z)}{Q' \ln(r_i/r_w)}\right] \frac{Q' H \kappa}{Q H' \kappa'} \quad (4)$$

where
$\mu$ is the viscosity, in centipoises, of the aqueous flooding fluid injected into a selected stratum;
$Q$ is the volumetric flow rate, in barrels per day, of flooding fluid injected into the selected stratum;
$k$ is the average permeability, in darcies, of the selected stratum;
$H$ is the vertical-thickness, in feet, of the selected stratum;
$Z$ is the vertical distance, in feet, from the bottom of the reservoir to the midpoint of the selected stratum;
$\Delta\gamma$ is the difference in density, in lbs/ft³, between the reservoir fluid and the flooding fluid;
$r_i$ is the distance, in feet, from the well to the interface between the flood front and the reservoir fluid;
$r_w$ is the radius of the well bore, in feet; and the prime (') represents the value of the indicated parameter in the uppermost stratum of the reservoir.

The flooding fluid viscosity required to offset the additional driving pressure due to difference in gravity heads is also dependent upon the distance of the flood front from the injection well. Equations 3 and 4 require that the viscosity of the flooding fluid injected into each of he variously disposed strata be continuously adjusted throughout the radial extent of the reservoir in order to eliminate gravity segregation of the flooding fluids in the lower strata. While the viscosity of the flooding fluid injected into any particular stratum can be modified in situ by delayed action, etc., it is usually preferred to employ a flooding fluid having a viscosity that is the average of those required throughout the radial extent of each particular stratum.

The true average viscosity of the flooding fluid injected into any particular vertically disposed stratum can be determined by the application of rigorous mathematics to equation 4. However, an approximate arithmetic or log-mean average can be obtained by a somewhat more simplified mathematical treatment. For example, for any particular stratum, an arithmetic average viscosity can be determined by calculating the flood viscosity at several selected radii and then averaging these calculated values. A somewhat more simplified approach can be made, however, by substituting an average radius ($r_{ia}$), in feet, for the flood radius ($r_i$) in equation 4, and then calculating the desired fluid viscosity for each stratum. An exemplary average radius which can be employed herein is a time-average radius, i.e., the distance from the well bore of the advancing flood front when the flooding process has proceeded for a period equal to approximately one-half the time required to completely flood the reservoir between the injection and production wells.

While it is apparent that the viscosity of the flooding fluid injected into each of the variously disposed strata can be held constant at the calculated average value throughout the entire flooding operation, in a more preferred embodiment of the invention the viscosity of the fluid being injected into each stratum is reduced as the flood front moves away from the injection well. It is apparent that the viscosity of the fluid can be continuously decreased throughout the injection, however, it is usually more convenient to incrementally adjust the fluid viscosity by sequentially injecting into each stratum a plurality of slugs having decreasing viscosities. Thus, a plurality of slugs of aqueous flooding fluid can be sequentially injected into each of the variously disposed strata, the viscosity of each subsequent slug injected into a particular stratum being lower than the viscosity of the preceding slugs in the stratum.

The quantity of flooding fluid in each slug injected into each stratum is preferably between about 0.05 and 0.5 pore volume of the stratum. The appropriate viscosities of the injected slugs can be calculated from the following equation:

$$p'_i - p'_w + \frac{\Delta \gamma}{144}(Z' - Z) = \frac{Q}{7.07 \kappa H}\left[\mu_a ln\left(\frac{r_a}{r_b}\right) + \mu_b ln\left(\frac{r_b}{r_c}\right) + \ldots \mu_m ln\left(\frac{r_m}{r_w}\right)\right] \quad (5)$$

where
$P'_i$ is the average pressure, in lbs/in2, at the interface between the flooding front and the formation fluid in the uppermost stratum;
$P'_w$ is the average pressure, in lbs/in², in the well bore in the uppermost stratum;
$\mu_a$ is the viscosity, in centipoises, of the first injected slug in a selected stratum;
$\mu_b$ is the viscosity, in centipoises, of the second injected slug in the selected stratum;
$\mu_m$ is the viscosity, in centipoises, of the $m^{th}$ injected slug in the selected stratum;
$r_a$ is the distance, in feet, from the well to the leading edge of the first injected slug;
$r_b$ is the distance, in feet, from the well to the leading edge of the second injected slug;
$r_c$ is the distance, in feet, from the well to the leading edge of the third injected slug;
$r_m$ is the distance, in feet, from the well to the leading edge of the $m^{th}$ injected slug;
$m$ is a whole number, generally between about 2 and 100, representing the number of radial viscosity adjustments.

While the viscosity of each aqueous slug calculated from equation 5 for each stratum is dependent upon the distance from the injection well to the leading edge of the slug, it s is preferred that each thickened slug have a viscosity based on the average value required over the radial extent of the reservoir to be flooded by that slug. Average slug viscosities can be determined by the techniques hereinabove disclosed.

The viscous aqueous flooding fluids are separately injected into the contiguous, vertically disposed strata through an injection well completed in a manner that provides for the separate injection of the fluids without appreciable mixing in the well of fluids injected into the separate strata. One embodiment of practicing the method of this invention in a reservoir comprised of a plurality of contiguous strata is illustrated in the drawing, wherein an injection well 10 is shown drilled through a subterranean formation 12 and penetrating a partially depleted permeable oil-bearing reservoir 14. Concentric tubing strings 16, 18, 20, 22 and 24 are suspended in the well 10 and extend downwardly from the surface to various selected depths. The well is lined with a suitable liner 28 having a plurality of perforations 30. Mechanical packers 26 are placed within the well to pack off vertical well sections 40, 42, 44, 46 and 48 adjacent the approximate boundaries of the selected contiguous, permeable strata 50, 52, 54, 56 and 58. However, the placement of packers 26 is not essential for the practice of this invention and, alternatively, may be omitted. Producing well 32 is completed in each of the permeable strata in the conventional manner.

In operation, viscous fluids A, B, C, D and E are simultaneously injected into injection tubes 16, 18, 20, 22 and 24, respectively, at volumetric flow rates selected to provide substantially identical radial fluid velocities in the various strata of the reservoir. These fluids are introduced into isolated well sections 40, 42, 44, 46 and 48, and pass outwardly through perforations 30 into the adjacent strata 50, 52, 54, 56 and 58. In a slug injection operation, the injection of fluids A, B, C, D and E is terminated after a sufficient quantity of the flooding fluid has been forced into the reservoir, and thereafter floodwater is injected through each injection tube to drive the viscous slug through the reservoir towards a producing well 32.

Line 100 represents the leading edge of a flood front in a conventional water or polymer solution flooding operation, and illustrates the effect of gravity segregation on the flooding media. It is clearly apparent that early breakthrough of the flooding fluids into the producing well at the lower strata presents a serious problem. Line 120, on the other hand, represents the leading edge of the flood front in an aqueous flooding process wherein the flooding fluid viscosity is adjusted at progressively lower strata in accordance with equation 4 or 5. It is apparent that even though some gravity segregation occurs in individual strata, gravity segregation as a whole is greatly reduced and early breakthrough of flooding fluid into the producing well is substantially avoided. The gravity segregation in each individual stratum is reduced as the thickness of the stratum is decreased, with flood front 120 becoming a substantially straight vertical line in the ideal case, i.e., where the flooding fluid viscosity is adjusted throughout the vertical extent of the reservoir.

The concentration of thickening agent required to impart any particular viscosity to the aqueous flooding fluid under reservoir conditions depends upon the particular additive employed and the environmental conditions of the system. However, the required concentrations can be readily determined by routine testing. Generally, the concentration of additive in the flooding fluid ranges from about 0.001 to about 10 weight-percent, and where the additive is a water-soluble polymer, the concentration is typically within the range of about 0.001 to 1 weight-percent, and usually within the range of about 0.001 to 0.5 weight-percent.

The invention is further described by the following examples which are illustrative of two specific modes of practicing the invention, and which are not intended as limitations on the scope of the invention.

EXAMPLE 1

This example illustrates the embodiment of this invention wherein a plurality of slugs of an aqueous flooding fluid are sequentially injected into an oil-bearing reservoir having a plurality of vertically disposed contiguous permeable strata. The oil-bearing reservoir is penetrated by an injection well and a spaced production well and is substantially as shown in the drawing. The injection well is completed with five concentric tubing strings having packers set between the termini of the various tubing strings adjacent the approximate boundaries of the permeable strata 50, 52, 54, 56 and 58. The aqueous flooding fluids A, B, C, D and E are prepared at the surface and slugs of the flooding fluids having decreasing viscosities, are sequentially injected into tubes 16, 18, 20, 22 and 24, respectively, at volumetric flow rates calculated to provide substantially equal horizontal fluid velocities in the strata.

In the exemplary process, flooding fluid A injected into the uppermost stratum 50 is flood water having a viscosity of 0.5 centipoises at the reservoir conditions, however, it is to be recognized that the advantages of a polymer flood can be realized by increasing the viscosity of each of the flooding solutions. The values of the reservoir parameters and of the various injection conditions are summarized in table 1.

viscosities are adjusted to he next tabulated values. The flood injection and viscosity adjustments are continued until substantial quantities of the injected flooding fluid break into the producing well. Tracer tests are conducted at various intervals during the flooding operation to verify that a substantially uniform vertical flood is maintained throughout the radial extend of the reservoir.

EXAMPLE 2

This example illustrates the practice of this invention wherein a viscous slug is injected into the oil-bearing reservoir and forced therethrough with a conventional water flood. The well completion, reservoir and the various parameters are substantially the same as illustrated in example 1. Aqueous flooding fluids, designated as A,B, C,D and E are prepared at the surface and a slug of each fluid injected into the respective strata. Each slug is forced through the reservoir by the subsequent injection of flood water into each stratum.

In this exemplary process, the producing well is spaced 500 feet away from the injection well and the selected size of the viscous slug amounts to a 0.3 pore volume of the reservoir enclosed between the injection and production well. In addition, fluid A injected into the uppermost stratum 50 is an aqueous polymer solution having an effective viscosity of 10 centipoises.

The viscosity of each viscous slug is calculated from equation 5, at arbitrarily selected radii of 125 feet, 250 feet, and 375 feet, and the calculated values arithmetically averaged.

TABLE I

| Parameter | Strata | | | | |
|---|---|---|---|---|---|
| | 50 | 52 | 54 | 56 | 58 |
| Average permeability, ($\kappa$), millidarcies | 500 | 450 | 600 | 400 | 300 |
| Average porosity, ($\phi$), percent | 25 | 20 | 25 | 20 | 15 |
| Vertical thickness of stratum (H), feet | 70 | 40 | 50 | 60 | 80 |
| Vertical distance from the bottom of the reservoir to the midpoint of the stratum, (z), feet | 265 | 210 | 165 | 110 | 40 |
| Total injection rate (q) bbls./day | 3,000 | 3,000 | 3,000 | 3,000 | 3,000 |
| Gravity difference ($\Delta\gamma$), lbs./ft.$^3$ | 12 | 12 | 12 | 12 | 12 |
| Effective radius of well bore ($r_w$), feet | 1 | 1 | 1 | 1 | 1 |
| Water saturation percent of pore volume | 35 | 35 | 35 | 35 | 35 |

The rate of injection of each aqueous flooding fluid into the respective stratum is calculated from conventional relationships, and the viscosity of each flooding fluid is calculated from equation 5 at radii corresponding to injection intervals of 2 days, 7 days, 14 days, 30 days, 90 days and 365 days. The calculated values of the injection rates and the viscosities at various injection intervals are tabulated in table II for each stratum.

TABLE II

| | Injection rate, bbls./day | Required viscosity, cp. | | | | | |
|---|---|---|---|---|---|---|---|
| | | 2 days | 7 days | 14 days | 30 days | 90 days | 365 days |
| Fluid: | | | | | | | |
| A | 850 | 0.50 | 0.50 | 0.50 | 0.50 | 0.50 | 0.50 |
| B | 388 | 1.03 | 0.96 | 0.93 | 0.90 | 0.85 | 0.82 |
| C | 608 | 1.53 | 1.38 | 1.31 | 1.25 | 1.18 | 1.11 |
| D | 582 | 1.70 | 1.51 | 1.43 | 1.35 | 1.25 | 1.16 |
| E | 582 | 2.62 | 2.28 | 2.14 | 2.01 | 1.85 | 1.70 |

Accordingly, five aqueous flooding fluids corresponding to fluids A, B, C, D and E are prepared having viscosities equal to the values tabulated in the third column of table II, and injected into the responsive injection tube 16, 18, 20, 22 and 24, at injection rates commensurate with the above tabulated values. The fluid injections are continued until the next injection interval is attained, at which time the flooding fluid The calculated values of the viscosities are tabulated in table III.

TABLE III

| | Injection rate, bbls./day | Viscosity of slug, cp. | | | |
|---|---|---|---|---|---|
| | | 125 feet | 250 feet | 375 feet | Average |
| Fluid: | | | | | |
| A | 850 | 10 | 10 | 10 | 10 |
| B | 388 | 13.0 | 15.1 | 18.3 | 15.5 |
| C | 608 | 15.3 | 19.4 | 25.7 | 20.1 |
| D | 582 | 14.3 | 19.6 | 27.7 | 20.5 |
| E | 582 | 16.2 | 23.9 | 35.7 | 25.3 |

Accordingly, aqueous flooding fluids A, B, C, D and E having viscosities corresponding to the above tabulated average values are prepared, and 0.30 pore volume of the fluids are injected into strata 50, 52, 54, 56 and 58, respectively, at the above tabulated volumetric injection rates. After the injection of 0.3 pore volume of each aqueous flooding fluid, flood water is injected into each stratum at about the same injection rates until substantial quantities of the flooding fluids break into the spaced producing well. Tracer tests are conducted at various intervals during the flooding operation to verify that gravity segregation is substantially decreased from that expected in a conventional flooding operation.

The present invention involves the concept of adjusting the effective viscosity of a flooding fluid injected into a permeable oil-bearing reservoir to substantially overcome the forces present in the formation that promote gravity segregation.

Various embodiments and modifications of this invention have been described in the foregoing description and examples, and several further modifications will be apparent to those skilled in the art. Such modifications are included within the scope of this invention as defined by the following claims. While the foregoing equations can be used as a basis for estimating the fluid viscosity necessary to overcome these forces under particular reservoir conditions, it will be obvious to those skilled in the art that other methods of predicting the required fluid viscosities can be employed and that the foregoing viscosity estimates can be further refined by the inclusion of other known parameters and by making further minor modifications thereto.

I claim:

1. A method for reducing gravity segregation of an aqueous flooding fluid injected into a subterranean reservoir containing fluids of lower density than said aqueous flooding fluid, which comprises adjusting the viscosity of the aqueous flooding fluid injected into progressively lower levels so as to decrease the mobility of the flooding fluid injected into the lower levels of the reservoir sufficiently to offset the additional pressure exerted by the higher density aqueous flooding fluid at these lower levels tending to drive said fluid through the reservoir, whereby a vertical flood front is established and substantially uniformly advanced through the reservoir.

2. A method for reducing gravity segregation of an aqueous flooding fluid injected in to a relatively thick, subterranean reservoir containing fluids of lower density than said aqueous flooding fluid, which comprises simultaneously injecting a plurality of aqueous flooding fluids into alike plurality of vertically disposed contiguous permeable strata in said reservoir, the viscosity of the aqueous flooding fluid injected into each progressively lower stratum being adjusted so as to incrementally decrease the mobility of the flooding fluid in said lower stratum sufficiently to offset the additional pressure exerted by the higher density aqueous flooding fluids at the lower stratum tending to drive said aqueous flooding fluids through said stratum, whereby a flood front is established and substantially uniformly advanced through said reservoir.

3. The method defined in claim 2 wherein the viscosity of said aqueous flooding fluid is adjusted by the addition of a minor proportion of a water-soluble polymer thereto.

4. The method defined in claim 3 wherein said water-soluble polymer is acrylic acid-acrylamide copolymer, acrylic acid-acrylamide-diacetone acrylamide terpolymer, polyacrylamide, partially hydrolyzed polyacrylamide, hydroxyethyl cellulose, carboxymethyl cellulose, polyoxyethylene, or polysaccharide.

5. The method defined in claim 2 wherein each of said permeable strata has a vertical thickness of between about 5 and 75 feet.

6. The method defined in claim 2 wherein a plurality of slugs of said aqueous flooding fluid are sequentially injected into each of said permeable strata, the viscosity of each successive slug injected into each stratum being lower than the viscosity of the preceding slugs injected into that stratum.

7. The method defined in claim 6 wherein each slug of said aqueous flooding fluid is injected into said permeable stratum in the amount of between about 0.05 and 0.5 pore volume of said stratum.

8. The method defined in claim 6 wherein the viscosity of the aqueous flooding fluid injected into each stratum required to eliminate gravity segregation of the flooding fluid in the reservoir varies through out the radial extent of the stratum, and wherein each successive slug of said aqueous flooding fluid injected into each stratum has a viscosity based on the average value required over the radial extend of the reservoir to be flooded by that slug.

9. The method defined in claim 2 wherein a slug of said aqueous flooding fluid is injected into each of said permeable strata and displaced through each of said strata by the subsequent injection of a fluid selected from the group consisting of water and brine.

10. The method defined in claim 9 wherein said slug of aqueous flooding fluid is injected into each stratum in the amount of between about 0.05 and 0.5 pore volume of said stratum.

11. The method defined in claim 9 wherein a plurality of slugs of said aqueous flooding fluid are sequentially injected into each of said permeable strata, the viscosity of the aqueous flooding fluid injected into each stratum required to eliminate gravity segregation of the flooding fluid in the reservoir varies throughout the radial extend of the stratum and wherein each successive slug of aqueous flooding fluid injected into each stratum has a viscosity based on the average value required over the radial extend of the reservoir to be flooded by that slug.

12. The method defined in claim 2 wherein said aqueous flooding fluid is injected into each of said permeable strata at a substantially constant volumetric flow rate.

13. A method for recovering oil from a relatively thick oil-bearing subterranean reservoir penetrated by at least one injection well and one or more production wells, which comprises:

simultaneously injecting a plurality of aqueous flooding fluids through said injection well into a like plurality of vertically disposed contiguous permeable strata in said reservoir so as to displace reservoir oil from said strata, the rate of injection of aqueous flooding fluid into each stratum being selected to provide a substantially equal fluid velocity in each stratum, and the viscosity of said aqueous flooding fluid injected into each progressively lower stratum being adjusted so as to incrementally decrease the mobility of the flooding fluid in said lower stratum; and recovering oil from said production well.

14. The method defined in claim 13 wherein the viscosity of said aqueous flooding fluid injected into each of said permeable strata is adjusted so as to incrementally decrease the mobility of the flooding fluid in each progressively lower stratum sufficient to offset the additional pressure exerted by the higher density aqueous flooding fluid at the lower stratum tending to drive said aqueous flooding fluid through said reservoir.

15. The method defined in claim 13 wherein said aqueous flooding fluid is injected into each of said permeable strata at a substantially constant volumetric flow rate through out the flooding operation.

16. The method defined in claim 13 wherein the viscosity of said aqueous flooding fluid is adjusted by the addition of a minor proportion of a water-soluble polymer.

17. The method defined in claim 16 wherein said water-soluble polymer is acrylic acid-acrylamide copolymer, acrylic acid-acrylamide-diacetone acrylamide terpolymer, polyacrylamide, partially hydrolyzed polyacrylamide, hydroxyethyl cellulose, carboxymethyl cellulose, polyoxyethylene, or polysaccharide.

18. The method defined in claim 13 wherein each of said strata has a vertical thickness of between about 5 and 75 feet.

19. The method defined in claim 13 wherein said aqueous flooding fluid is injected into each stratum through a separate tubing string in the injection well and wherein packers are placed in said injection well near the terminus of each tubing string and adjacent the approximate boundaries of said permeable strata.

20. A method for recovering oil from a relatively thick, subterranean reservoir penetrated by at least one injection well and one or more production wells, which comprises:

simultaneously injecting through said injection well a plurality of aqueous flooding fluids into a like number of vertically disposed contiguous permeable strata so as to displace reservoir fluids of lower density than said aqueous flooding fluids from said strata, the rate of injection of aqueous flooding fluid into each stratum being controlled to provide a substantially equal fluid velocity in each stratum, and the viscosity of said aqueous flooding fluid injected into each progressively lower stratum being selected so as to incrementally decrease the mobility of the flooding fluid in said lower stratum sufficient to offset the additional pressure exerted at the lower stratum by the higher density aqueous flooding fluids tending to drive said aqueous flooding fluid through said reservoir;

thereafter simultaneously injecting flood water into each of said strata at injection rates that provide a substantially equal flood velocity in each stratum; and recovering oil from said production well.

21. The method defined in claim 20 wherein the viscosity of each of said aqueous flooding fluids is adjusted by the addition of controlled proportions of a water soluble polymer to the solutions.

22. The method defined in claim 21 wherein said water-soluble polymer is acrylic acid-acrylamide copolymer, acrylic acid-acrylamide -diacetone acrylamide terpolymer, polyacrylamide, partially hydrolyzed polyacrylamide, hydroxyethyl cellulose, carboxymethyl cellulose, polyoxyethylene, or polysaccharide.

23. The method defined in claim 20 wherein each of said strata has a vertical thickness of between about 5 and 75 feet.

24. The method defined in claim 20 wherein said aqueous flooding fluid in injected into each of the variously disposed strata through a separate tubing string in the injection well and wherein packers are placed in said injection well between the termini of the tubing strings and adjacent the approximate boundaries of said permeable strata.

25. A method for recovering oil from a relatively thick, subterranean reservoir having a plurality of vertically disposed contiguous permeable strata penetrated by at least one injection well and one or more producing wells, which comprises:

1. inserting a separate injection tube in said injection well to a depth adjacent each permeable stratum;
2. packing off each of said injection tubes in the injection well between the termini of adjacent injection tubes;
3. simultaneously injecting an aqueous flooding fluid through said injection tubes into each of said permeable strata, the viscosity of said aqueous flooding fluid injected into each progressively lower stratum being adjusted so as to incrementally decrease the mobility of the flooding fluid in said lower stratum, and
4. recovering oil from said producing well.

26. The method defined in claim 25 wherein the viscosity of said aqueous flooding fluid injected into each progressively lower stratum is selected in accordance with the following equation:

$$\mu = \left[ \mu' + \frac{4.9 \times 10^{-2} \kappa' H \Delta' \gamma (Z' - Z)}{Q' \ln(r_{ia}/r_w)} \right] \frac{Q' H \kappa}{Q H' \kappa'}$$

where $\mu$ is the viscosity, in centipoises, of the aqueous flooding fluid injected into a selected stratum;

$Q$ is the volumetric flow rate, in barrels per day, of flooding fluid injected into said selected stratum;

$k$ is the average permeability, in darcies, of the selected stratum;

$Z$ is the vertical distance, in feet, from the bottom of the reservoir to the midpoint of the selected stratum;

$\Delta\gamma$ is the difference in density, in pounds per cubic foot, between the reservoir fluid and the flooding fluid;

$H$ is the vertical thickness, in feet, of the selected stratum;

$r_{ia}$ is an average radius, in feet, of the interface between the aqueous flooding fluid, and the displaced fluid;

$r_w$ is the radius of the well bore, in feet; and

Prime (') represents value of the indicated parameter in the uppermost stratum of the reservoir.

UNITED STATES PATENT OFFICE
CERTIFICATE OF CORRECTION

Patent No. 3,565,175          Dated February 23, 1971

Inventor(s)    James W. Wilson

It is certified that error appears in the above-identified patent and that said Letters Patent are hereby corrected as shown below:

Claim 2, column 9, line 31, "alike" should be - a like

Claim 24, column 11, line 24, "in" should be - is - .

Claims 4, 17, 22 have blank spaces for no apparent reas

Specification, column 4, equation 2, "(h-z" should be -- (h-z) --.

Specification, column 6, line 9, "it s is" should be -- it is - .

Signed and sealed this 3rd day of August 1971.

(SEAL)
Attest:

EDWARD M. FLETCHER, JR.         WILLIAM E. SCHUYLER, JR
Attesting Officer                Commissioner of Patents